July 16, 1963 R. W. BLISS 3,098,163
INERTIAL ENERGY GENERATOR STORAGE SYSTEM
Filed July 5, 1960

*INVENTOR.*
ROBERT W. BLISS
BY
*Lockwood, Woodard, Smith & Wiikart*
ATTORNEYS

United States Patent Office 3,098,163
Patented July 16, 1963

3,098,163
INERTIAL ENERGY GENERATOR STORAGE SYSTEM
Robert W. Bliss, Champaign, Ill., assignor to The Magnavox Company, Fort Wayne, Ind., a corporation of Delaware
Filed July 5, 1960, Ser. No. 40,783
7 Claims. (Cl. 310—8.4)

This invention relates generally to electrical energy generation and storage systems, and more particularly to inertial energy generator and storage systems.

In ordnance work, missiles and projectiles frequently employ electrical energy in their detonator trains. Conventionally, electrical energy is supplied by a battery or the like and separate devices are employed for applying energy from the battery to the detonator train at the proper time. In connection with the devices used to employ the electrical energy, means are always provided to permit the keeping of the projectile or missile in a safe unarmed condition until it is desirable that the missile or projectile should be armed. Efforts are constantly directed to the simplicity of the arming and detonator systems for projectiles and missiles and to improvement of the reliability thereof.

It is, therefore, a general object of this invention to provide means for generation and storage of electrical energy.

It is another object of this invention to provide means having the ability to generate and store electrical energy in response to changes of motion.

It is another object of this invention to provide sturdy and reliable means for accomplishing the foregoing objects.

The present invention includes in its scope a supported and insulated piezoelectric crystal which is subjected to loading by an inertial mass in response to acceleration of the unit. The inertial mass is packaged with switching members to allow generation, retention and eventual use of electrical energy obtained as the result of accelerations and decelerations of the unit.

The full nature of the invention will be understood from the accompanying drawings and the following description and claims.

Figure 3:
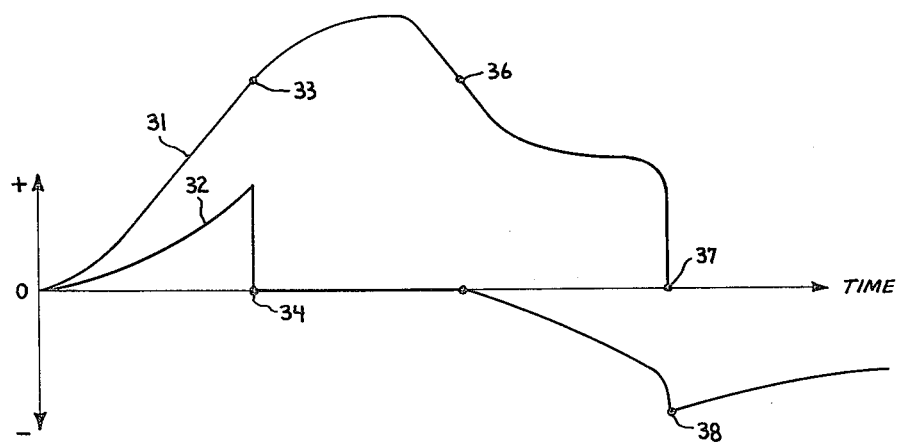

FIG. 3 presents curves useful in explaining the sequence of events occurring in the use of the invention.

Figure 1:
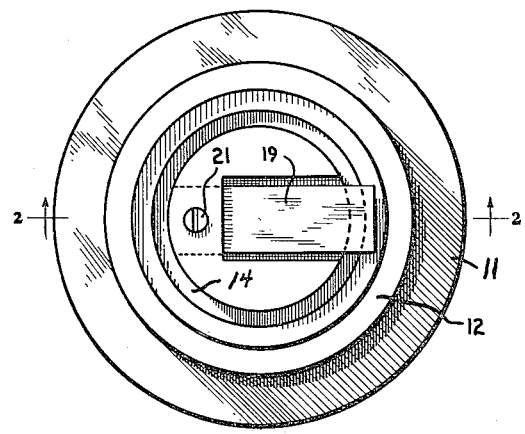
FIG. 1 shows an axial view of a typical embodiment of this invention.

Referring to FIG. 1, there is shown an axial or plan view illustrating a generally circular configuration of the unit characteristic of a typical embodiment of the invention.

Figure 2:
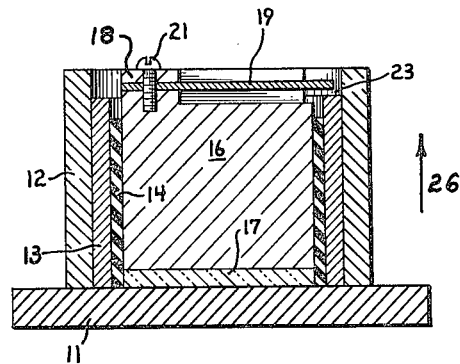
FIG. 2 shows a section taken along the line 2—2 of FIG. 1.

In FIG. 2, which is a section taken along the lines 2—2 of FIG. 1, there is shown a base 11 usually made of an electrically conductive material. A casing 12, circular in form, contains a shorting sleeve 13 which in turn surrounds an insulator sleeve 14. An inertial mass 16 is disposed within the insulator sleeve 14 and a piezoelectric crystal 17 is sandwiched between the base 11 and the mass 16. A portion 18 of the mass 16 supports a spring mass switching member 19 which is fastened thereto by means of a screw 21.

In operation of the invention, referring to FIG. 3, as acceleration of the unit of FIG. 2 increases in the direction shown by the arrow 26, the acceleration can be represented by the curve 31 of FIG. 3. As the acceleration increases, the inertial mass compresses the crystal 17 to generate a voltage represented in FIG. 3 by the curve 32. At the same time the switching member 19 deflects toward the shorting sleeve 13 in the region designated by reference numeral 23. As the acceleration continues to increase to the point 33 on curve 31, the switch member engages the shorting sleeve and the voltage across the crystal 17 drops to zero at point 34 of curve 32 in FIG. 3.

The acceleration continues to increase, levels off and then decays. At point 36 on curve 31 the acceleration has decayed to the extent that the switching member 19 recovers sufficiently to unshort the crystal 17. As the acceleration decreases from the point 36, the loading of the crystal by the inertial mass 16 decreases so that the voltage across the crystal of an opposite polarity is generated. The voltage of opposite polarity, which will be designated the negative polarity, becomes more negative until at the point 37 of the acceleration curve, the acceleration has dropped to zero. At this point the voltage has reached its negative maximum designated by reference numeral 38 from which maximum it will decay at a rate determined by leakage until it reaches zero or it is utilized.

By employing a circuit across the crystal which, for example, could be connected on one side to the inertial mass and on the other side to the base 11, the various voltages generated can be employed in any manner desired. For example, a circuit responsive to only a negative voltage across the crystal could be used to arm a projectile immediately upon the decrease of acceleration to zero.

The invention has been employed as an example in artillery fuzes where energy is generated on gun setback, stored during flight, and used to initiate electrical detonators on target impact.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

I claim:

1. An inertial energy generator-storage system comprising: a crystal disposed between a pair of relatively movable parts and an electrical switch in a circuit across said crystal, said switch having a contact in fixed relation to one of said parts, and a contact mounted on the other of said parts in movable relation thereto; said movable contact and one of said parts being movable with respect to the other of said parts in the same direction, and said movable contact being normally resiliently separated from said fixed contact and closeable with said fixed contact in response to acceleration in a direction of relative movability between said parts whereby electrical potentials are generated and stored by said crystal in response to changes of motion of said parts.

2. An inertial energy generator-storage system comprising: a crystal disposed between a pair of relatively movable parts; and an electrical switch in a circuit across said crystal, said switch having a contact in fixed relation to one of said parts, and a contact mounted on the other of said parts in movable relation thereto, said movable contact and one of said parts being movable with respect to the fixed contact and the other of said parts respectively in the same direction, and said movable contact being normally resiliently separated from said fixed contact and closeable with said fixed contact in response to a predetermined acceleration in a direction of relative movability between said movable contact and said fixed contact, whereby electrical potentials are generated and stored by said crystal in response to changes of motion of said parts.

3. An inertial energy generator-storage system comprising: a crystal disposed between a mass and a carrier; and an electrical switch in a circuit across said crystal, said switch having a contact in fixed relation to said carrier, and a contact in movable relation to said fixed contact, said movable contact being mounted to said mass and movable in unison with said mass with respect to the carrier in the same direction, and said movable contact being normally resiliently separated from said fixed contact and closable with said fixed contact in response to a predetermined acceleration in a direction of relative movability between said movable contact and said fixed contact, whereby electrical potentials are generated and stored by said crystal in response to changes of motion of said carrier.

4. An inertial energy generator-storage system comprising: a base; a casing affixed to said base; a mass guideably disposed in said casing; a piezoelectric crystal disposed between said base and said mass; an electrical switch in a circuit across said crystal, said switch having a relatively movable and a relatively fixed contact, said movable contact being mounted to said mass and resiliently separated from said fixed contact and closeable with said fixed contact in response to acceleration in the direction said mass is guided in said casing whereby electrical potential differences are produced and stored in response to changes in physical stresses in said crystal imposed by changes of motion affecting the relation between said mass and said base.

5. An inertial energy generator-storage system comprising: a base; a casing affixed to said base and having an end abutting said base; a shorting sleeve of electrically conductive material disposed in said casing with an outside surface adjacent an inside surface of said casing; an insulator sleeve of electrically insulating material disposed within said shorting sleeve; a mass disposed within said insulator sleeve with its outside surface adjacent the inside surface of said insulator sleeve; a switch including a resilient electrical contact member in proximate association with said shorting sleeve and normally separated from said shorting sleeve; a piezoelectric crystal disposed between said base and said mass to produce and store electrical potential differences between a portion adjacent said base and a portion adjacent said mass in response to changes in physical stresses imposed by changes of motion affecting the relation between said mass and said base, said switch and said shorting sleeve being in a circuit across said crystal with said resilient contact member responsive to changes in motion of said system to close and open the said circuit by engagement with and disengagement from contact with said shorting sleeve.

6. An inertial energy generator-storage system comprising: a base; a casing affixed to said base; a shorting sleeve of electrically conductive material disposed in said casing with its outside surface adjacent the inside surface of said casing; an insulator sleeve of electrically insulating material disposed within said shorting sleeve; a mass disposed within said insulator sleeve with its outside surface adjacent the inside surface of said insulator sleeve and supporting adjacent one end a resilient electrical contact member in proximate association with said shorting sleeve and normally separated from said shorting sleeve and having electrical conducting means communicating between said contact member and the other end of said mass; a piezoelectric crystal supported by said base between said base and said mass to produce and store electrical potential differences between a portion adjacent said base and a portion adjacent the said other end of said mass in response to changes in physical stresses imposed by changes of motion affecting the relation between said mass and said base.

7. An inertial energy generator-storage system comprising: a base; a cylindrical casing affixed to said base with its axis perpendicular to a flat surface of said base abutting an end of said casing; a cylindrical shorting sleeve of electrically conductive material disposed in said casing with its outside diameter adjacent the inside diameter of said casing; a cylindrical insulator sleeve of electrically insulating material disposed within said shorting sleeve; a generally cylindrical mass disposed within said insulator sleeve with its outside diameter adjacent the inside diameter of said insulator sleeve and supporting adjacent one end a resilient electrical contact member in proximate association with said shorting sleeve and normally separated therefrom and having electrical conducting means communicating between said contact member and the other end of said mass; a piezoelectric crystal supported by said base within said insulator sleeve between said base and said mass to produce and store electrical potential differences between its side adjacent said base and its side adjacent the said other end of said mass in response to changes in physical stresses imposed by changes of motion affecting the relation between said mass and said base.

References Cited in the file of this patent
UNITED STATES PATENTS

| | | |
|---|---|---|
| 2,934,017 | Ellett | Apr. 26, 1906 |
| 2,918,007 | Zaugg | Dec. 22, 1959 |